United States Patent [19]
Kawasaki

[11] Patent Number: 5,689,493
[45] Date of Patent: Nov. 18, 1997

[54] A SUPER-RESOLUTION OPTICAL HEAD WITH SIGNAL CORRECTIVE CIRCUIT

[75] Inventor: Satoshi Kawasaki, Tokyo, Japan

[73] Assignee: NEC Corporation, Japan

[21] Appl. No.: 626,558

[22] Filed: Apr. 1, 1996

[51] Int. Cl.[6] .................................................. G11B 7/00
[52] U.S. Cl. ...................... 369/124; 369/44.23; 369/11.8
[58] Field of Search .................................. 369/44.24, 124, 369/118, 44.23, 59, 32

[56] References Cited

U.S. PATENT DOCUMENTS 5,610,895   3/1997   Izumi et al. ............................ 369/112

FOREIGN PATENT DOCUMENTS

2-12622   1/1990   Japan ............................ G11B 7/135
2-91829   3/1990   Japan ............................ G11B 7/125

*Primary Examiner*—David C. Nelms
*Assistant Examiner*—Kim-Kwok Chu
*Attorney, Agent, or Firm*—Hayes, Soloway, Hennessey, Grossman & Hage, P.C.

[57] ABSTRACT

An optical disk device is provided which can remove errors derived from the influence of side lobe components in read-out signals from a superresolution optical head, thereby reducing the information reading error. The optical disk device comprises: a superresolution optical head; and a signal corrective circuit for correcting read-out signals from the superresolution optical head, wherein the signal corrective circuit comprises a sign reversal detecting circuit for detecting information on sign reversal of the read-out signals, a singular point signal detecting section for detecting read-out signals, a predetermined period of time before the sign reversal and a predetermined period of time after the sign reversal, as singular point signals, and a read-out signal correction output section for outputting corrected read-out signals provided by multiplying the detected singular point signals by a predetermined coefficient and adding the read-out signals to signals obtained respectively by, with the sign reversal point as the center, replacing the signal before the sign reversal with the signal after sign reversal and replacing the signal after the sign reversal with the signal before the sign reversal.

5 Claims, 9 Drawing Sheets

PHASE CHANGE TYPE DISK

FIG. 4B

PHASE PIT TYPE DISK

A SUPER-RESOLUTION OPTICAL HEAD WITH SIGNAL CORRECTIVE CIRCUIT

FIELD OF THE INVENTION

The present invention relates to an optical disk device and particularly, to an optical disk device which reproduces information with a superresolution optical head.

BACKGROUND OF THE INVENTION

For optical disk devices in recent years, a superresolution optical head has become mounted thereon in order to cope with an increase in recording density of an optical disk medium. Conventional superresolution optical heads are shown in FIGS. 1 to 3A–3D. Conventional techniques for the superresolution optical head are described, for example, in Japanese Patent Laid-Open Nos. 12622/1990 and 91829/1990.

Figure 1:
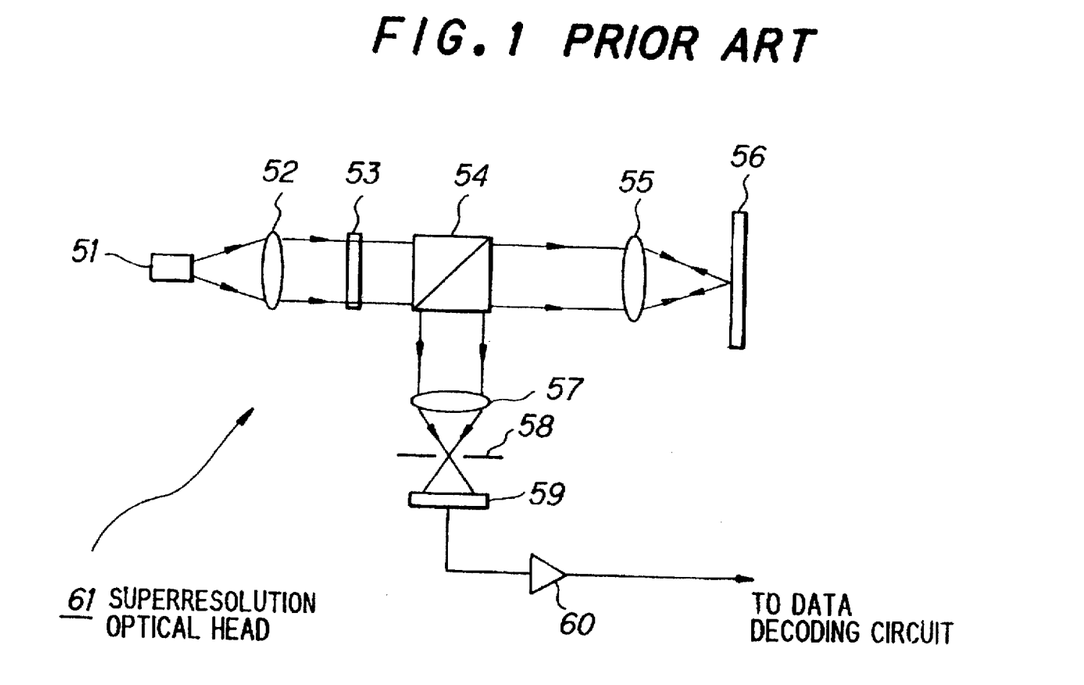
FIG. 1 is an explanatory diagram of a conventional superresolution optical head.
Figure 2:
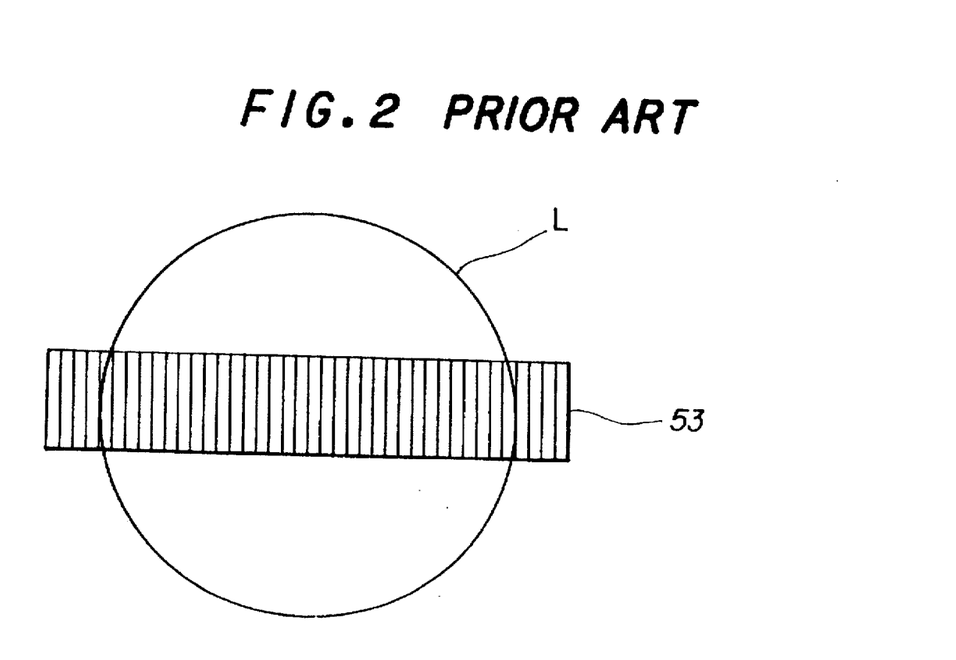
FIG. 2 is an explanatory diagram showing the regulation of a laser spot in the superresolution optical head shown in FIG. 1.
Figure 3A:
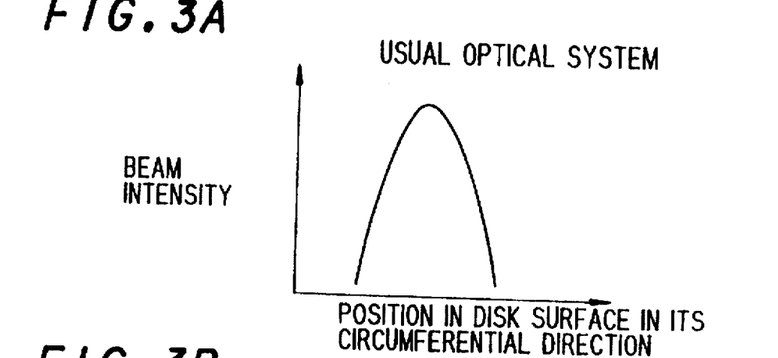
FIG. 3A is a diagram showing the intensity of a beam on an optical disk medium in a usual optical system.
Figures 3B, 3C:
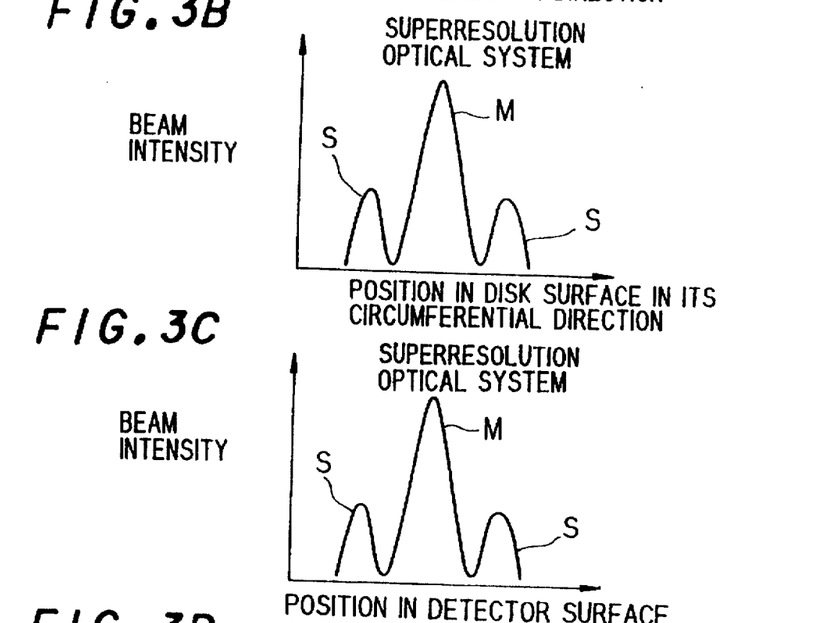
FIG. 3B is a diagram showing the intensity of a beam on an optical disk medium in a superresolution optical system.
FIG. 3C is a diagram showing the intensity of a beam on a pinhole or a slit in a superresolution optical system.

In FIG. 1, laser beams emitted from a laser beam source 51 are converted to parallel beams by means of a collimator lens 52. Changing the beam intensity and the phase distribution in the far field by means of a light shielding or phase sheet 53 results in a change in the form of a spot of a laser beam which has been passed through an object lens 55 and condensed on an optical disk medium 56. For example, as shown in FIG. 2, when a portion near the center of the cross section of the beam is shielded by means of a rectangular light shielding sheet 53, the spot condensed on the optical disk medium 56 generally has such a distribution that, as shown in FIG. 3B, the beam is separated into a main lobe component M having a smaller diameter than a spot in a usual optical system (FIG. 3A) and a side lobe component S which appears on both sides of the main lobe component M.

Figure 3D:
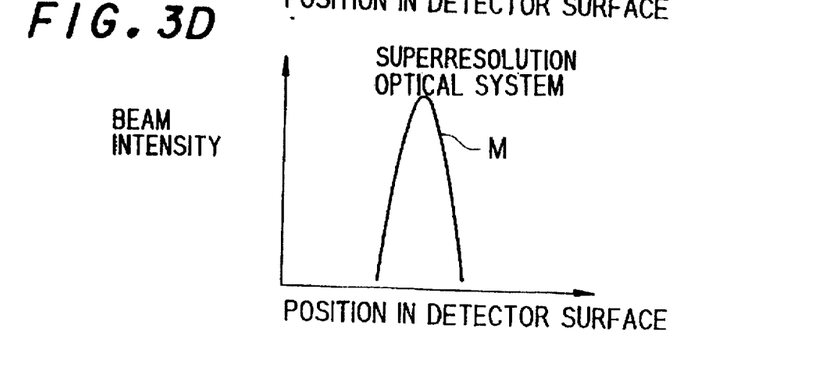
FIG. 3D is a diagram showing the intensity of a beam on a detector in a superresolution optical system.

The light returned from the optical disk medium 56 is condensed with the object lens 55, passed through a beam splitter 54, passed through a condensing lens 57, and re-condensed on a pinhole or a slit 58. In this case, the beam intensity distribution is such that, as shown in FIG. 3C, the beam is again separated into the main lobe component M and the side lobe component S. When the pinhole diameter or slit width has a smaller diameter than the diameter of the main lobe, as shown in FIG. 3D, the beam passed through the pinhole/slit 58 ideally consists of the main lobe component M alone. A detector 59 receives the main lobe component M and converts it to electric signals (read-out signals). The read-out signals are input into a data decoding circuit through a current-voltage conversion amplifier 60, thereby reproducing information from the optical disk.

Thus, in a signal reproduction system using a superresolution optical head, a general technique used in the art is to dispose a slit or a pinhole before a detector in the head, thereby optically separating side lobe components contained in a beam returned from an optical disk medium.

Figure 4A:
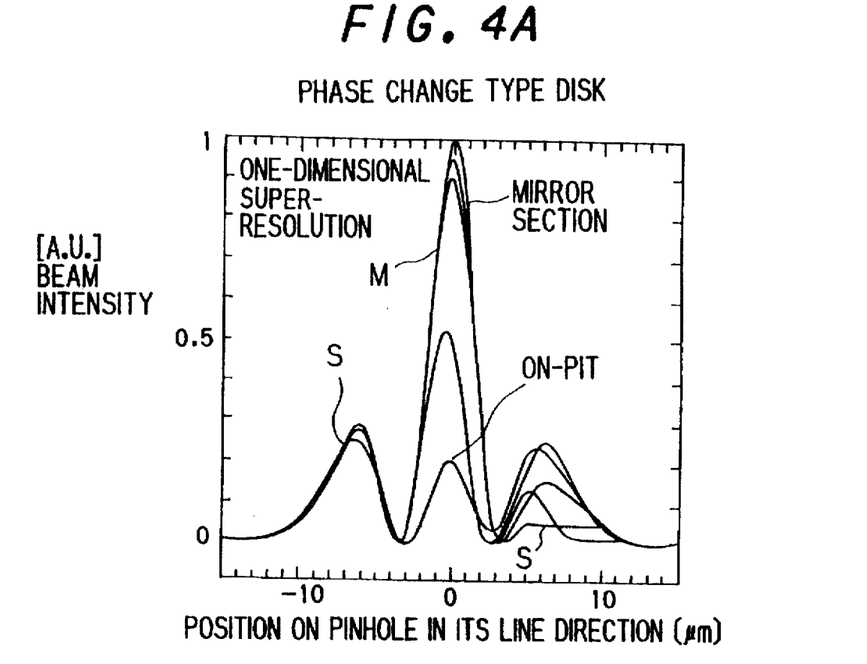
FIG. 4A is a diagram showing the intensity distribution of a beam in the case of a phase change type disk medium and FIG. 4B is a diagram showing the intensity distribution of a beam in the case of a phase pit type disk medium.
Figure 4B:
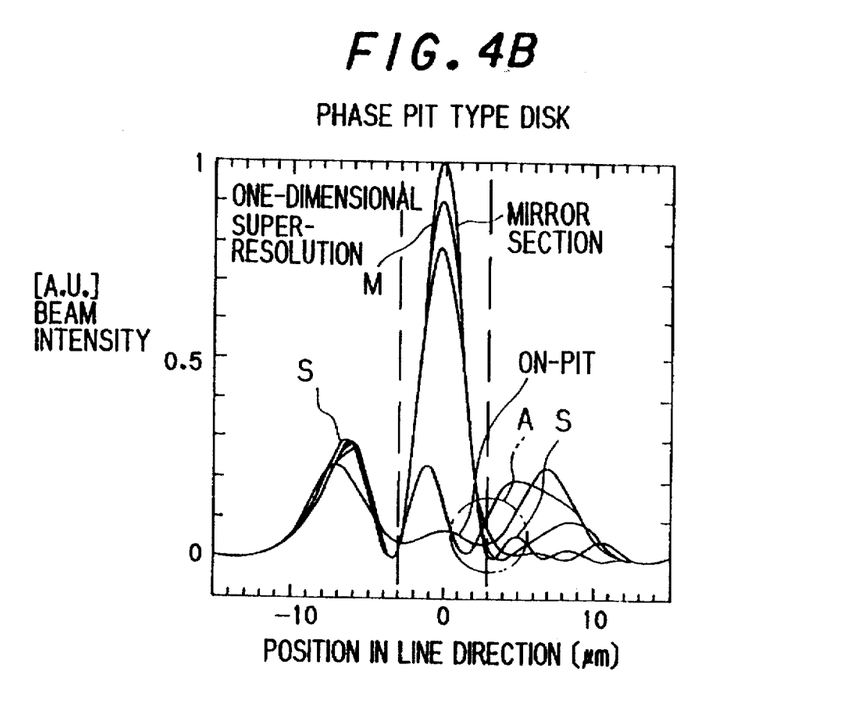

In the above prior art, when information is recorded as irregularities (phase pits) on an optical recording medium, as indicated by symbol A in FIG. 4B, a valley created between the main lobe component M and the side lobe component S is shifted toward the main lobe side to cause part of the side lobe component S to be passed through the pinhole and detected as the main lobe component M. In this case, an error occurs in the read-out signals, disadvantageously resulting in increased read-out error of information. Further, this spoils the advantage inherent in the superresolution optical head and makes it impossible to cope with an increase in recording density.

The above inconvenience occurs in the case of recording of information as irregularities on the surface of an optical disk medium and does not occur in the case of, for example, an optomagnetic disk medium or a phase change type disk medium where information is recorded by utilizing the direction of magnetization and a difference in reflectance and the disk surface is flat.

FIGS. 4A and 4B show a beam intensity distribution in the case of read-out of information recorded on a phase change type disk medium and a phase pit type medium. These data were obtained by scalar field approximate optical calculation and show a beam intensity distribution on a pinhole/slit. Both the drawings demonstrate such a change in beam intensity that in a distribution where the center of the main lobe M is located in the center of the pit (a distribution indicated as "on-pit" in the drawing), the position of the pit and the main lobe is gradually shifted and finally causes the main lobe to be completely separated from the pit (a distribution indicated as "mirror section" in the drawing).

In the case of the phase change type disk medium shown in FIG. 4A, there is no possibility that the valley between the main lobe and the side lobe is shifted toward the left or right direction. Therefore, only the main lobe component can always pass through the pinhole and reach the detector. On the other hand, in the case of the phase pit type medium shown in FIG. 4B, there is a possibility that, as indicated by symbol A in the drawing, the valley between the main lobe and the side lobe is shifted toward the left or right direction in the drawing. This is causative of the above inconvenience.

Figure 5A:
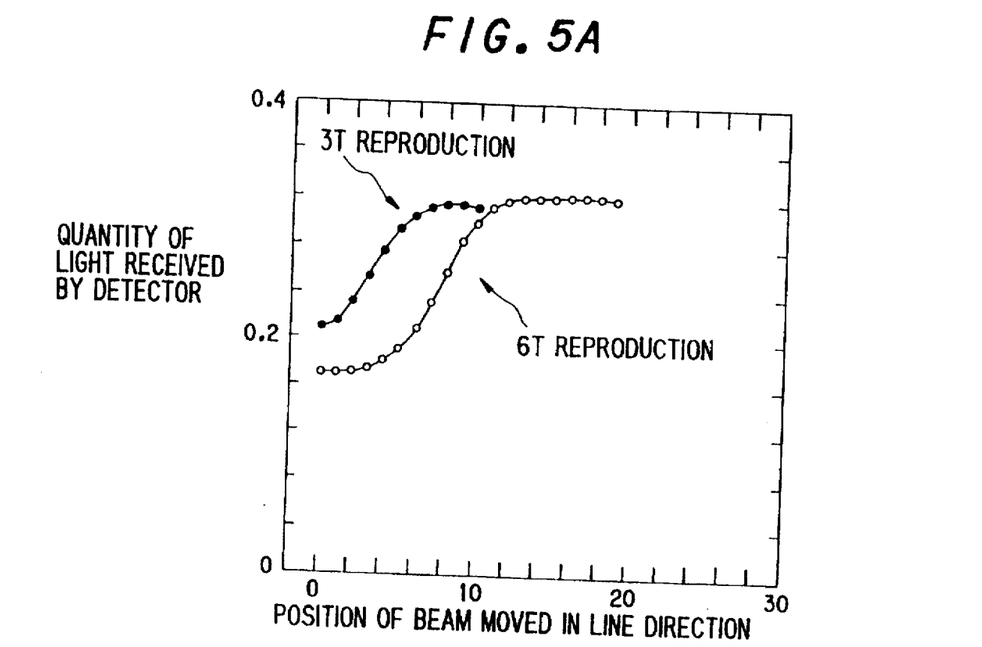
FIG. 5A is a diagram showing the relationship in the case of a phase change type disk medium and FIG. 5B is a diagram showing the relationship in the case of a phase pit type disk medium.
Figure 5B:
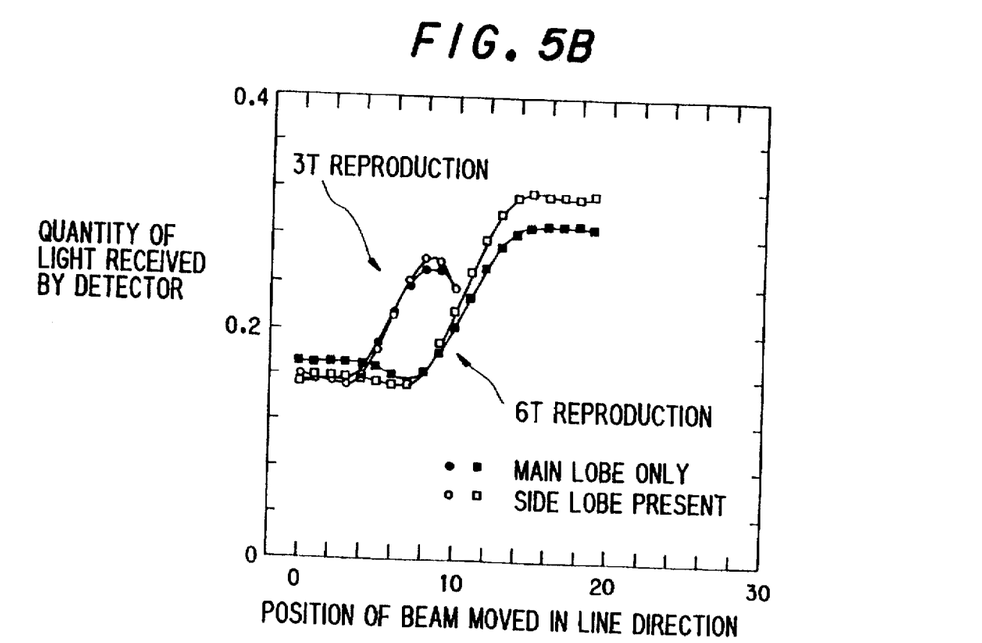

Read-out signals obtained as a result of receipt of the beam intensity distributions shown in FIGS. 4A and 4B are shown respectively in FIGS. 5A and 5B.

In the case of the phase change type disk medium shown in FIG. 5A, when the main lobe is moved from the on-pit to the mirror section, the read-out signals are changed smoothly. On the other hand, in the case of the phase pit type medium shown in FIG. 5B, as is apparent from comparison of the obtained signals with ideal signals shown in the drawing, a signal error occurs. In this case, the error occurs in the direction of amplitude amplification relative to the ideal signals consisting of the main lobe component alone. This is due to the properties of the detector.

Figure 6A:
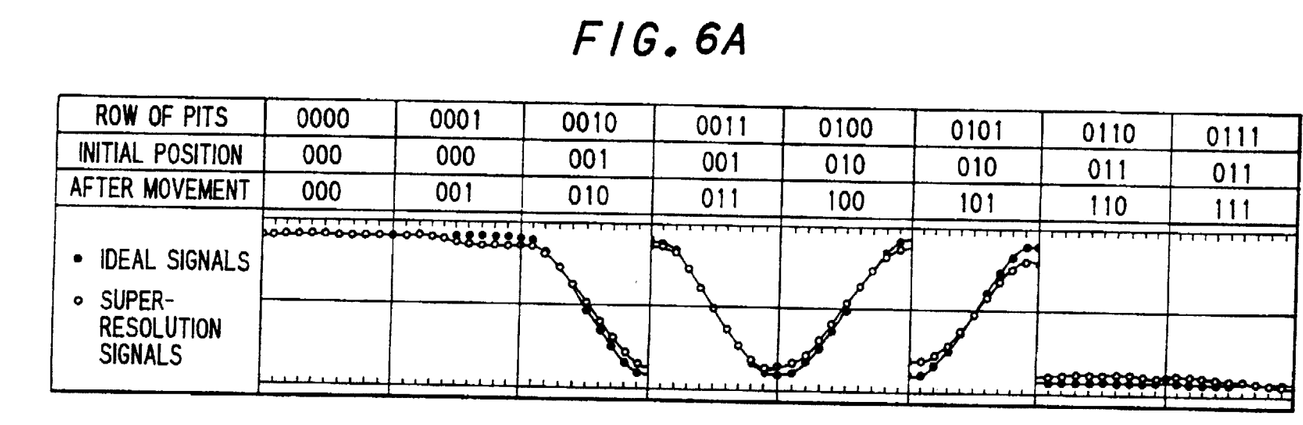
FIG. 6A is a diagram showing the first half of the results obtained by the simulation and FIG. 6B is a diagram showing the second half of the results obtained by the simulation.
Figure 6B:
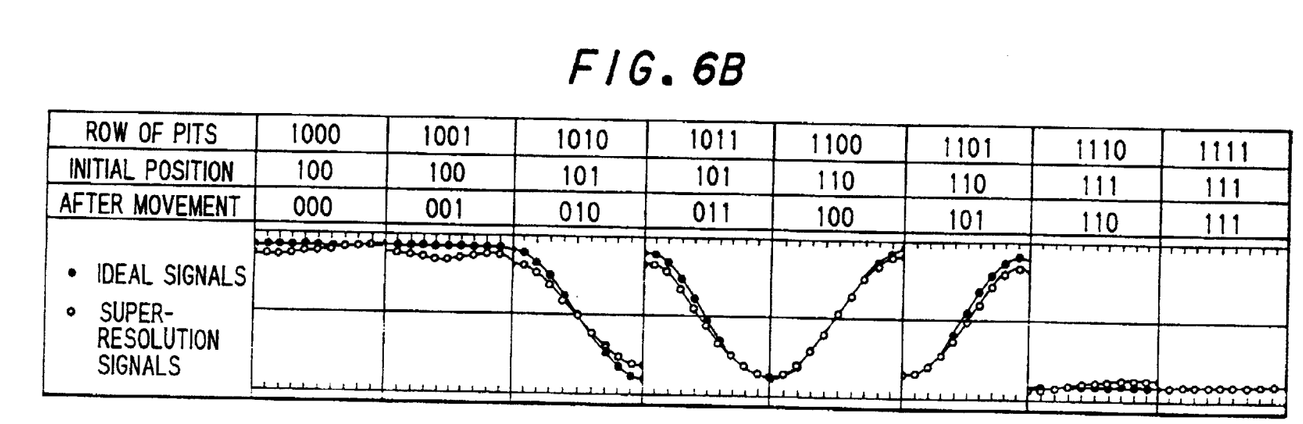
Figure 7:
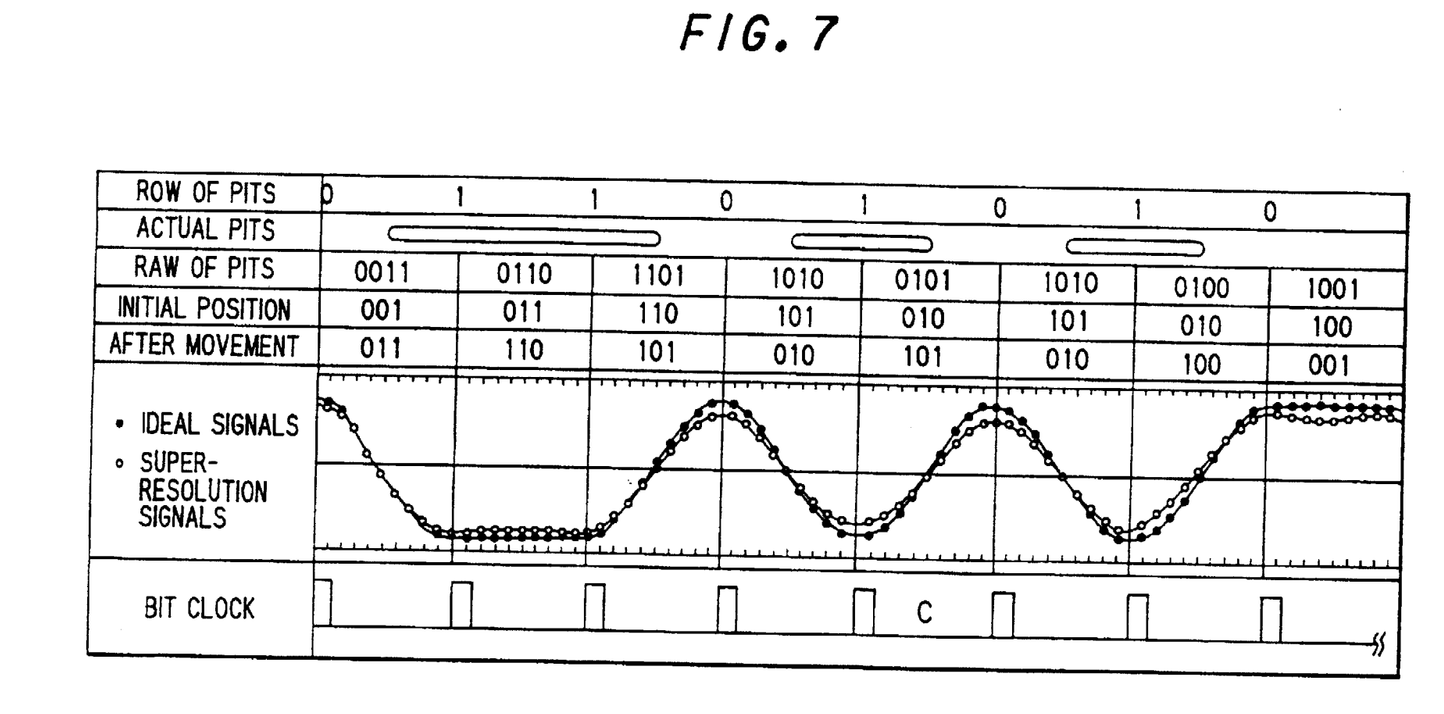
FIG. 7 is a diagram showing one example of read-out signals obtained by re-arranging the results of the simulation as shown in FIGS. 6A and 6B and actual pits corresponding to the read-out signals.

Further, in order to investigate the situation under which the read-out signal error is created, the read-out signals obtained by using a superresolution optical head were computed by optical simulation. The results are shown in FIGS. 6 and 7. In this case, the properties of the detector are on the premise that the signal cause an error in the amplitude attenuation direction relative to the ideal signal.

Figure 8:
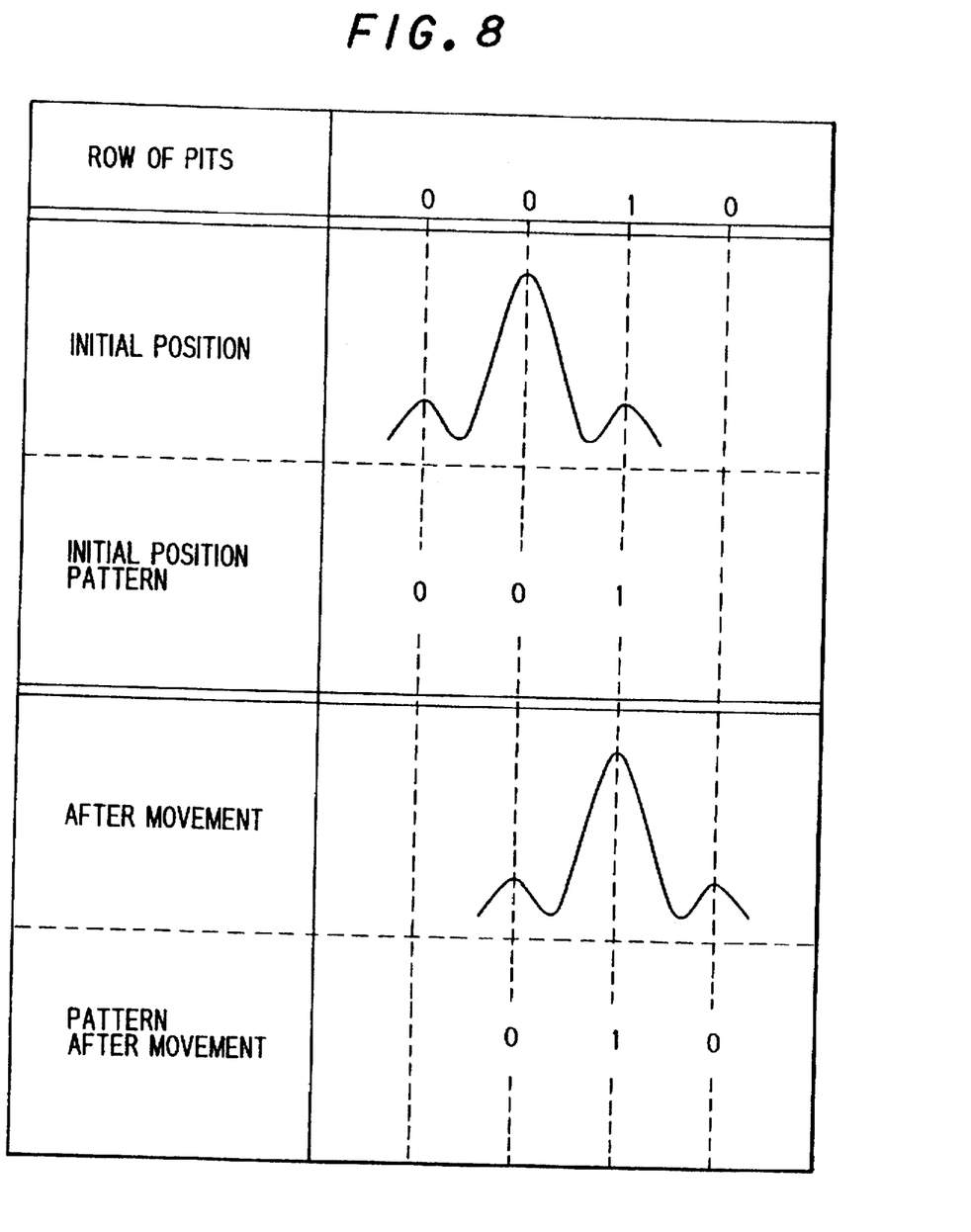
FIG. 8 is an explanatory diagram showing the relationship between a pattern at an initial position and a pattern after movement in FIGS. 6 and 7.

At the outset, in FIGS. 6A and 6B, 16 read-out signal patterns from 0000 to 1111 (binary number) were presumed, and read-out signals in the case of movement of the beam on these pits as shown in FIG. 8 were calculated. FIG. 7 shows the re-arrangement of the patterns shown in FIGS. 6A and 6B as one example of the actual read-out signals. The results of the above simulation revealed the following facts.

(1) When there is no difference between the pattern in initial position and the pattern after the movement (see FIG. 8), the read-out signal is not influenced by the side robe component (e.g., 0000).

(2) When sign reversal occurs at the rear side robe position, the error of read-out signals at the initial position is significant (e.g., 0111).

(3) When sign reversal occurs before and behind the side robe position, the error becomes significant at both the initial position and the position after the movement for the read-out signals (e.g., 0110).

From these conditions and one example of read-out signals shown in FIG. 7, it has been found that the occurrence of sign reversal of read-out signals, such as a change in slope near zero cross of the read-out signals and a shift of the position where the signal is changed from 1 to 0, creates an error derived from the side lobe component before and behind the sign reversal portion, although this varies depending upon how pits range.

SUMMARY OF THE INVENTION

An object of the present invention is to eliminate the above inconvenience of the prior art, particularly to prevent the influence of the side lobe component, thereby reducing the read-out error of the information to provide an optical disk device which can output good reproduced signals.

The above object of the present invention can be attained by an optical disk device comprising: a superresolution head; and a signal corrective circuit for correcting read-out signals from the superresolution optical head, wherein the signal corrective circuit comprises a sign reversal detecting circuit for detecting information on sign reversal of the read-out signals, a singular point signal detecting section for detecting read-out signals, a predetermined period if time before the sign reversal and a predetermined period of time after the sign reversal, as singular point signals, and a read-out signal correction output section for outputting corrected read-out signals provided by multiplying the detected singular point signals by a predetermined coefficient and adding the read-out signals to signals obtained respectively by, with the sign reversal point as the center, replacing the signal before the sign reversal with the signal after sign reversal and replacing the signal after the sign reversal with the signal before the sign reversal.

The term "singular point signals" used herein refers to signals indicating instantaneous values of read-out signals respectively before and after a predetermined period of time from the sign reversal. The expression "by, with the sign reversal point as the center, replacing the signal before the sign reversal with the signal after sign reversal and replacing the signal after the sign reversal with the signal after the sign reversal" refers to mutual replacement between the signal a predetermined period of time before the sign reversal and the signal a predetermined period of time after the sign reversal.

Read-out signals from a superresolution head are input into a sign reversal detecting circuit and, in addition, input into a singular point signal detecting section. Upon detection of information on sign reversal of read-out signals, the sign reversal detecting circuit outputs the trigger of operation to the singular point signal detecting section. The singular point signal detecting section, upon receipt of the trigger of operation, detects read-out signals, respectively a predetermined period of time before the sign reversal and a predetermined period of time after the sign reversal, as singular point signals. A read-out signal correction output section, upon receipt of the singular point signals, multiply the singular point signals by a predetermined coefficient to attenuate the amplitude and, at the same time, to compute correcting signals with positive and negative signs being reversed. Further, the correcting signals are added to the read-out signals to produce and output corrected read-out signals.

The proportion of the error created a predetermined period of time before the sign reversal and the proportion of the error created a predetermined period of time after the sign reversal are known to be approximately equal respectively to the read-out value after the predetermined period of time and the read-out signal value before the predetermined period of time.

For this reason, as described above, the read-out signal a predetermined period of time before the sign reversal and the read-out signal a predetermined period of time after the sign reversal are detected, the read-out signals are multiplied by a predetermined coefficient, and the value obtained by multiplying read-out signal before the sign reversal by the predetermined coefficient and the value obtained by multiplying read-out signal after the sign reversal by the predetermined coefficient are added respectively to the read-out signal after the sign reversal and the read-out signal before the sign reversal, thereby bringing the read-out signals before and after the sign reversal close to respective ideal values.

BRIEF DESCRIPTION OF THE DRAWINGS

FIGS. 3A to 3D are diagrams showing the intensity of a beam in a superresolution optical system or a usual optical system, wherein

FIGS. 4A and 4B are diagrams showing the intensity distribution of a beam on a pinhole in the superresolution optical head shown in FIG. 1, wherein

FIGS. 5A and 5B are diagrams showing the relationship between the light returned from an optical disk medium and the quantity of light received by a detector in the superresolution optical head shown in FIG. 1, wherein

FIG. 6A and 6B are diagrams showing a change in read-out signals, in the case of a superresolution optical head, provided by optical simulation, wherein

FIGS. 11A and 11B are explanatory diagrams for the operation of the signal corrective circuit shown in FIG. 10, wherein

DETAILED DESCRIPTION OF PREFERRED EMBODIMENTS

One embodiment of the present invention will be described with reference to FIGS. 9 to 11. The present embodiment is on the premise that read-out signals from a superresolution optical head cause errors in the amplitude attenuation direction relative to ideal signals.

Figure 9:
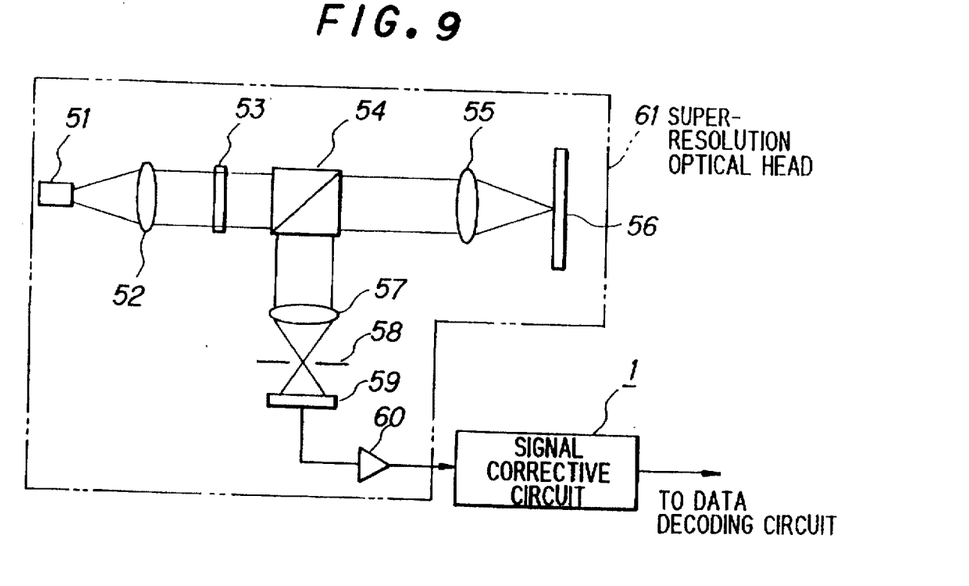
FIG. 9 is a diagram showing the position for incorporating a signal corrective circuit according to one embodiment of the present invention.

In FIG. 9, a reference numeral 61 designates a superresolution optical head identical to that described above in connection with the prior art, and a signal corrective circuit 1 is connected between an output stage and a data decoding circuit (not shown). Further, an input stage of the signal corrective circuit 1 is provided with a sample hold circuit and an A/D converter (each not shown), and the signal corrective circuit is designed so that digital signals are input. In this case, a sampling frequency is set at a value obtained by multiplying the bit clock by an integer (n/T wherein n is an integer).

Figure 10:
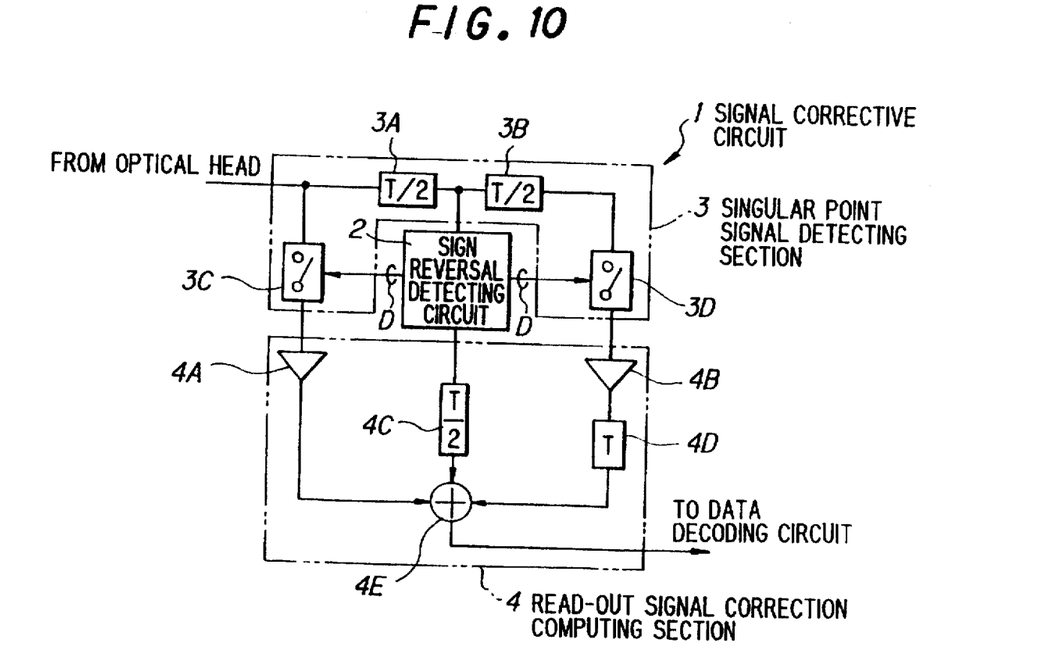
FIG. 10 is a block diagram showing the construction of the signal corrective circuit shown in FIG. 9.

FIG. 10 is a diagram showing the construction of a signal corrective circuit 1.

The signal corrective circuit shown in the block diagram of FIG. 10 comprises a sign reversal detecting circuit 2 for detecting information on sign reversal of the read-out signals (reproduced RF signals), a singular point signal detecting section 3 for detecting read-out signal values, a predetermined period time before the sign reversal and a predetermined period of time after the sign reversal, as singular point signals, and a read-out signal correction output section 4 for outputting corrected read-out signals provided by multiplying the detected singular point signals by a predetermined coefficient and adding the read-out signals to signals obtained respectively by, with the sign reversal point as the center, replacing the signal before the sign reversal with the signal after sign reversal and replacing the signal after the sign reversal with the signal after the sign reversal.

In the present embodiment, a sensor for detecting a reproduction linear velocity of an optical disk medium is provided in the vicinity of the medium. Based on the information, on reproduction linear velocity, output by the sensor, the predetermined period of time is automatically set at the half if the period T of the bit clock C, i.e., T/2, In this case, the value T varies depending upon the reproduction linear velocity. Further, the sign reversal detecting circuit 2 is designed so that the read-out signals of the delay value T/2 are held by signals synchronized with the bit clock C to judge the sign reversal portion of the sample value, thereby detecting the information on sign reversal.

In the above construction, as shown in FIG. 10, the singular point signal detecting section 3 comprises; a delay circuit 3A for outputting main signals obtained by delaying the phase of read-out signals (first branch signals) by a predetermined period of time; a delay circuit 3B for outputting second branch signals obtained by further delaying the phase of the main signals by a predetermined period of time; a sampling circuit 3C for detecting singular point signals from the first branch signals; and a sampling circuit 3D for detecting singular point signals from the second branch signals. In the present embodiment, the delay circuits 3A, 3B each comprise a multi-stage shift register. The shift register shifts signals by a clock obtained by multiplying the bit clock C by an integer. The sampling circuits 3C, 3D are designed so as to be operated in synchronization with trigger signals output from the sign reversal detecting circuit 2 and collect signals for a period of T/n (by one sampling period) upon receipt of the trigger.

The read-out signal corrective output section 4 comprises: multiplying circuits 4A, 4B for multiplying the singular point signals by a given coefficient; a delay circuit 4C for delaying the phase of the read-out signals output from the sign reversal detecting circuit 2 by a predetermined period of time; a delay circuit 4D for delaying the phase of the signals output from the multiplying circuit 4B by a period of time, which is twice the predetermined period of time; and an add circuit 4E for adding first and second correcting signals, which have been output respectively from the multiplying circuits 4A, 4B, to the read-out signals and outputting the corrected signals. Also in the read-out signal corrective output section 4, the delay circuits 4C, 4D each comprise the same multi-stage shift register as described above and are designed so that, as with the delay circuits 3A, 3B, the delay time is automatically set based on externally obtained information on the reproduction linear velocity.

Next, the operation of the signal corrective circuit mounted on the optical disk device of the present invention will be described with reference to FIGS. 9 to 11. In particular, FIGS. 11A and 11B show an embodiment where the read-out signals are based on information "01101010".

Figure 11A:
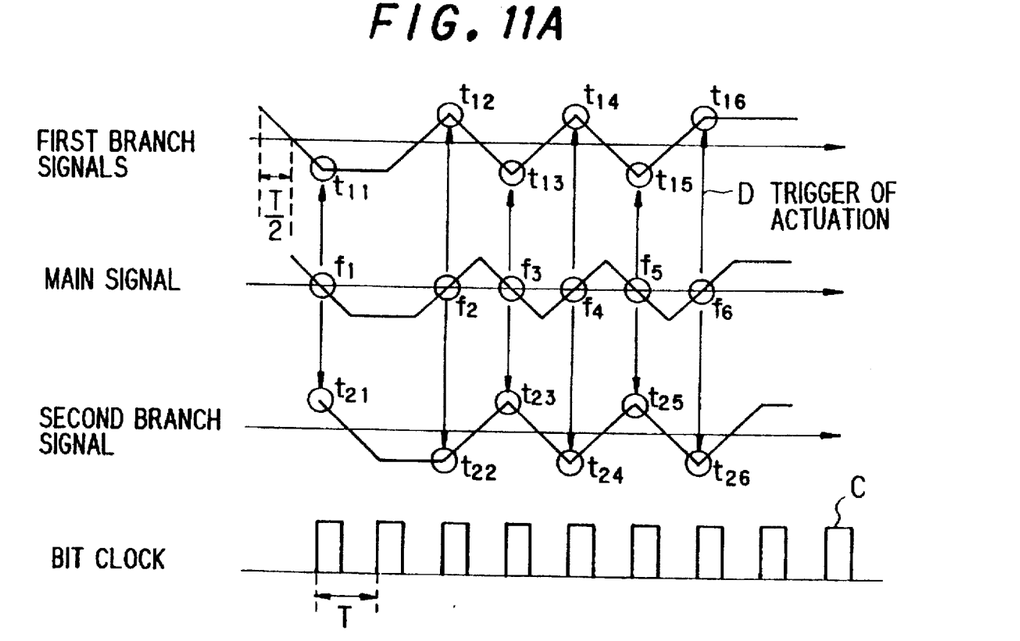
FIG. 11A is an explanatory diagram for the operation of a singular point signal detecting section and a sign reversal detecting circuit and FIG. 11B is a diagram showing the operation of a read-out signal correction output section.

Upon input of read-out signals into the singular point signal detecting section 3, the read-out signals are separated into the first branch signals identical to the read-out signals, main signals delayed by a predetermined period of time by the delay circuit 3A and the second branch signals obtained by further delaying the main signals by a predetermined period of time by the delay circuit 3B (FIG. 11A). The main signals are input into the sign reversal detecting circuit 2. Each time when the sign reversal detecting circuit 2 detects the sign reversal information f1 ... f6 for the main signals, trigger D of operation is output to the sampling circuits 3C, 3D. The sampling circuits 3C, 3D, upon receipt of the trigger D of operation, detect singular point signals $t_{11}$ ... $t_{26}$ from the input branch signals and output the singular point signals to the read-out signal correction output section 4.

On the other hand, in the sign reversal detecting circuit 2, when no sign reversal information is detected, the trigger D of operation is not input into the sampling circuits 3C and 3D and, in this case, the sampling circuits 3C and 3D bring the output signal to zero. Further, the output signal are brought to zero also in the case where when the sampling circuit 3D receives the trigger D of operation from the sign reversal detecting circuit 2, the second branch signals do not reach the sampling circuit 3D.

When the read-out-signal correction output section 4 receives the singular point signals $t_{11}$ ... $t_{26}$ and the main signals from the sign reversal detecting circuit 2, the singular point signals $t_{11}$ ... $t_{16}$ from the sampling circuit 3C are subjected to attenuation and sign reversal in the multiplying circuit 4A to produce correcting signals. On the other hand, the singular point signals $t_{21}$ ... $t_{26}$ from the sampling circuit 3D are subjected to attenuation and sign reversal in the multiplying circuit 4B. Thereafter, the main signals are delayed by a predetermined period of time by means of the delay circuit 4C. The signals from the multiplying circuit 4B is delayed by a period of time which is twice the predetermined period of time by the delay circuit 4D to produce the second correcting signals (FIG. 11B). The signals are fed into the multiplier 4E and added in the as delayed phase. Specifically, a correcting value based on the singular point signal $t_{11}$ is added to the bit clock C portion immediately before the sign reversal $f_1$. On the other hand, a correcting value based on $t_{21}$ is added to the bit clock C portion immediately after the sign reversal $f_1$. Further, as indicated by symbol B in FIG. 11B, in the bit clock C portion sandwiched between two sign reversals, both the singular point signals $t_{13}$ and $t_{22}$ are added. Thus, the added signals are output as corrected read-out signals to the data decoding circuit (not shown).

Figure 11B:
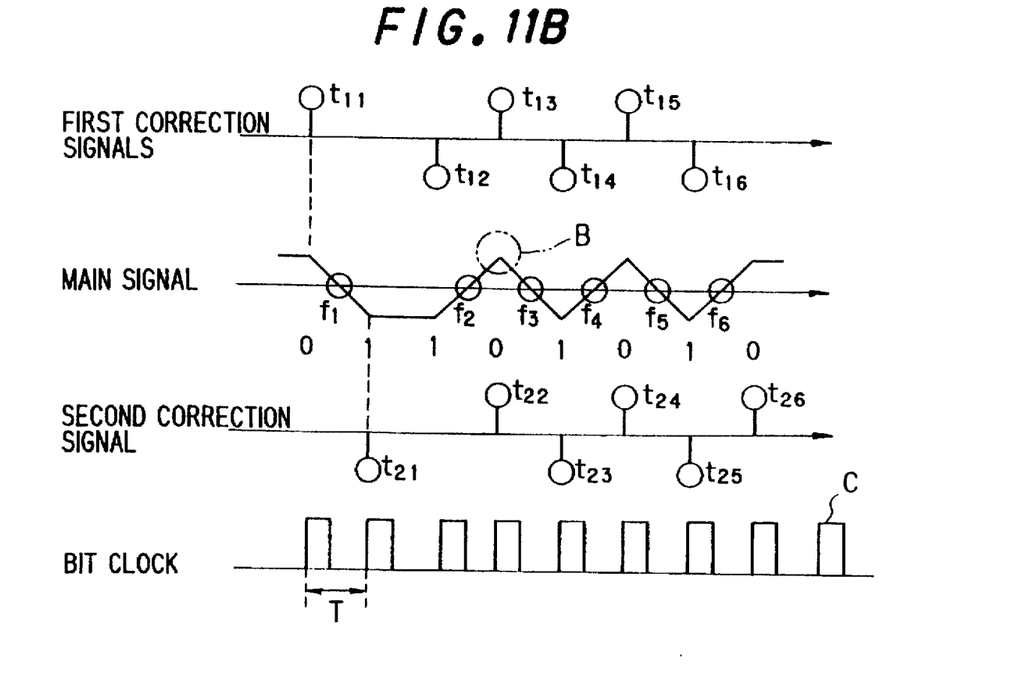

In the diagrams, of FIGS. 11A and 11B, showing signals within the corrective circuit, analog signals are given for convenience. In fact, however, the read-out waveform is corrected by digital signal processing. Further, the first and second correcting signals shown in FIG. 11B are drawn so as to have the same amplitudes as the singular point signals $t_{11} \ldots t_{26}$ shown in FIG. 11A. In fact, however, the amplitudes are equally attenuated by the action of the multiplying circuits 4A, 4B.

In this case, the proportion of the error created a predetermined period of time before the sign reversal and the proportion of the error created a predetermined period of time after the sign reversal have already been proven to be approximately equal respectively to the read-out value after the predetermined period of time and the read-out signal value before the predetermined period of time.

Therefore, as described above, the read-out signal value a predetermined period of time before the sign reversal and the read-out signal value a predetermined period of time after the sign reversal are detected, the read-out signals are multiplied by a predetermined coefficient, and the value obtained by multiplying read-out signal before the sign reversal by the predetermined coefficient and the value obtained by multiplying read-out signal after the sign reversal by the predetermined coefficient are added respectively to the read-out signal after the sign reversal and the read-out signal before the sign reversal, thereby bringing the above read-out signals before and after the sign reversal close to respective ideal values.

Thus, according to the present embodiment, information on sign reversal of read-out signals is detected, a read-out signal a predetermined period of time before the sign reversal and a read-out signal a predetermined period of time after the sign reversal are detected as singular point signals, and the read-out signals are corrected based on the results of the detection, thereby enabling the error, of the read-out signals, derived from the side lobe component S to be effectively removed.

In the present embodiment, although the predetermined time in the delay circuit was set at T/2, it may be set at values which are approximate to T/2 and can provide ideal read-out signals. Further, when read-out signals from the superresolution optical head create an error in the amplitude amplification direction relative to the ideal signals, it is possible to use a method wherein, in each of the multiplying circuits 4A, 4B of the read-out signal correction output section 4, the coefficient, by which the read-out signals are multiplied, is set at a predetermined positive number and no signal reversal is conducted.

When information is reproduced from an optical disk medium having both a portion where information is recorded as irregularities on the surface of the disk and a portion where information is recorded by utilizing the direction of the magnetization or an increase/decrease in the reflectance, the device may be designed so that the corrective circuit is operated only in the case of the reproduction of information recorded as irregularities on the surface of the optical disk and, in the other cases, the operation of the corrective circuit is in a stopped state.

In the optical disk device of the present invention, the signal corrective circuit may be constituted by an analog circuit.

According to the optical disk device, of the present invention, having the above constitution and functions, information on the sign reversal of read-out signals output from a superresolution optical head is detected, signal processing is carried out using a read-out signal obtained a predetermined period of time before the sign reversal and a read-out signal obtained a predetermined period of time after the sign reversal to correct the read-out signals. This enables the information reading error rate to be reduced and, hence, good reproduced signals to be output, which in turn makes it possible to provide an excellent optical disk device suitable also for an increase in recording density of an optical disk medium.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical disk device, comprising:
    a ultra high resolution optical head; and
    a signal corrective circuit for correcting a read-out signal form said ultra high resolution optical head;
    wherein said signal corrective circuit, comprises:
    a sign reversal detecting circuit for detecting a sign reversal information of said read-out signal;
    a singular point signal-detecting circuit for detecting read-out signals at a time prior to and after a predetermined time of a sign reversal time as singular point signals; and
    a read-out signal correction-computing circuit for computing a corrected read-out signal, said corrected read-out signal being obtained by adding correcting signals to said read-out signal, said correcting signal being obtained by multiplying predetermined coefficients to said singular point signals and exchanging said singular point signals preceding and following said sign reversal time.

2. The optical disk device as defined in claim 1, wherein:
    said singular point signal detecting circuit, comprises:
    a first delay circuit for providing a main signal obtained by deleting a phase of a first branch signal which is a read-out signal by a predetermined delay time;
    a second delay circuit for providing a second branch signal by delaying a phase of said main signal by said predetermined delay time;
    a first sampling circuit for detecting said singular point signal in said first branch signal; and
    a second sampling circuit for detecting said singular point signal in said second branch signal;
    said read-out signal correction-computing circuit, comprises:
    multipliers for multiplying a predetermined coefficient to said singular point signals;
    a third delay circuit for delaying a phase of an output signal of said sign reversal detecting circuit by said predetermined delay time;
    a fourth delay circuit for delaying a phase of a signal from a multiplier of said multipliers on a side of said second branch signal by a delay time which is twice said predetermined delay time; and an adder for providing said corrected read-out signal by adding said correcting signals supplied from said multipliers and delayed by said delay circuits to said read-out signal.

3. The optical disk device as defined in claim 2, wherein:

said predetermined delay time is set to be half a period of bit clock signals.

4. The optical disk device as defined in claim 1, wherein:

said singular point signal-detecting circuit sets an output of said singular point signal to be zero, when said sign reversal detecting circuit detects no sign reversal information in said read-out signal.

5. The optical disk device as defined in claim 1, wherein:

said singular point signal-detecting circuit sets said predetermined time of said sign reversal time dependently on a reproducing linear velocity of an optical disk.

* * * * *